L. D. PEARSALL.
ANIMAL TRAP.
APPLICATION FILED MAY 5, 1909.
954,045.
Patented Apr. 5, 1910.
2 SHEETS—SHEET 1.
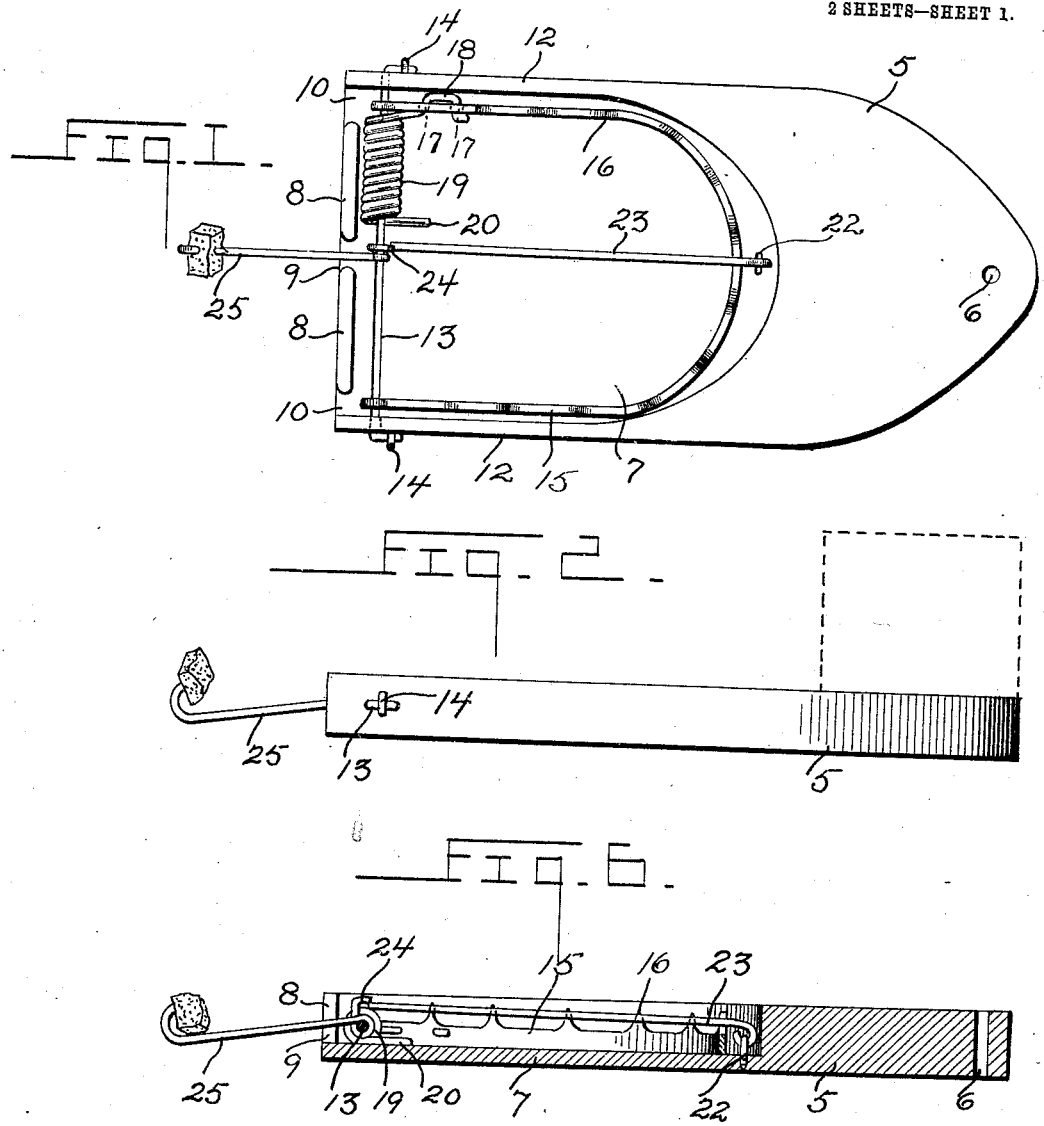
Witnesses
E. E. Johansen
E. L. Chandlee
Inventor
Latham D. Pearsall
By Woodward & Chandlee
Attorneys

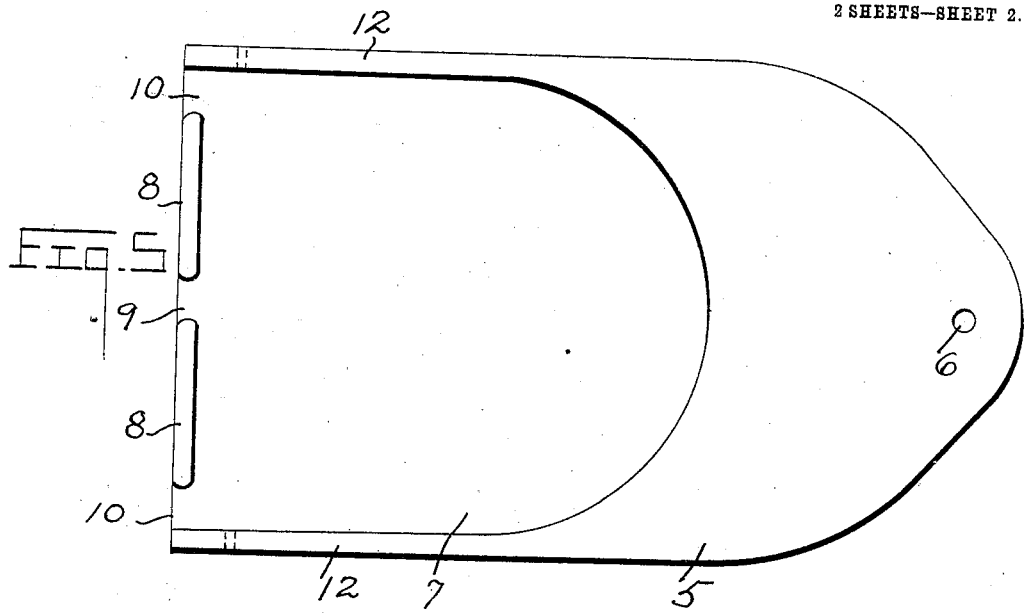
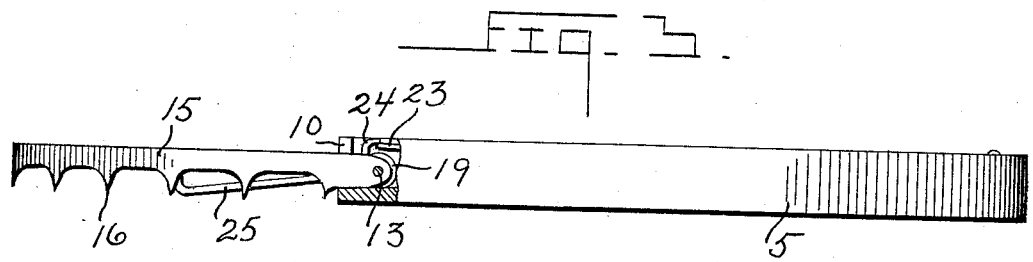
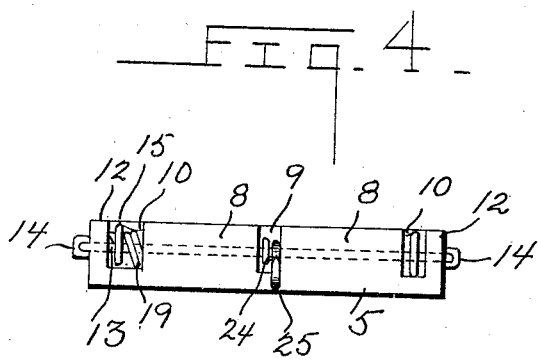

UNITED STATES PATENT OFFICE.

LATHAM D. PEARSALL, OF OCEANIC, NEW JERSEY.

ANIMAL-TRAP.

954,045.   Specification of Letters Patent.   Patented Apr. 5, 1910.

Application filed May 5, 1909. Serial No. 494,085.

*To all whom it may concern:*

Be it known that I, LATHAM D. PEARSALL, a citizen of the United States, residing at Oceanic, in the county of Monmouth and State of New Jersey, have invented certain new and useful Improvements in Animal-Traps, of which the following is a specification.

This invention relates to certain new and useful improvements in animal traps.

The object of my invention is to simplify the construction of traps especially designed to kill rats and mice.

A further object is to provide a trap so constructed that the animal to be caught does not step upon any part of the trap.

A further object is to provide a trap in the construction of which an impaling jaw will, on the release of a trigger, be thrown outward under force so as to strike the animal, the animal being impaled upon the striker jaw.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 is a top view of a trap embodying my invention, disclosing the same as set, Fig. 2 is an edge view of the trap as set, Fig. 3 is an edge view of the trap as sprung, Fig. 4 is an end view of the trap, Fig. 5 is a detached enlarged detail of the base, Fig. 6 is a lengthwise vertical sectional view through the trap showing the instrumentalities as set.

This invention relates to an improvement in that class of traps, in which a spring jaw is arranged to strike an animal and crush the same between the jaw and the base of the trap. Such a construction is found objectionable, however, in that the animal in dying seems to impart an odor to the trap that finally prevents other animals being caught. Blood and other secretions exuding from the dying animal also have a tendency to mar and scent the trap, so that finally the animals shun the trap.

In my invention, the floor or ground upon which the trap is set, serves as a base for the jaw, my invention being so arranged that an impaling jaw is thrown outward with such force, that the jaw will either so cripple the animal that the same cannot escape or the animal will be impaled upon the teeth of the striker jaw.

In the accompanying drawings, the nueral 5 designates a suitable base preferably made of wood, and oblong in outline and provided at one end with a suitable nail, peg or screw opening 6 by means of which a trap may be secured to the ground or floor, and which also serves to receive a suitable nail or screw by means of which the trap may be suspended when not in use.

The base of the trap is hollowed out and is provided with a depression or socket 7 approximately in the shape of a horse shoe as clearly disclosed in Fig. 5, and is provided with the base skirting flange 8 having the central opening 9, and the two edge openings 10, as clearly disclosed. The depression or socket is of such a size, that the trap along opposite edges is provided with the holding flanges 12, 12, each of which is provided with a suitable pin opening as shown.

Passing transversely across the socket 7 and proximal to the skirting base flange 8, is the pin 13 which has its opposite ends bent at right angles and secured by means of the staples 14, so that this pin cannot be removed from the base of the trap. Pivotally mounted upon the pin 13 is the sheet metal striking jaw 15, the lower edge of which is provided with a series of impaling points 16, as clearly disclosed in Fig. 3. This impaling jaw is bent in the form of a horse shoe and the socket 7 within the base of the trap is of such a depth, that when this impaling jaw is folded into the trap, the same lies below the upper surface of the base. One end of the impaling jaw is provided with the pin openings 17, through which openings is projected the end 18 of the coil spring 19, the remaining end 20 of the spring being held upon the bottom of the trap socket, as disclosed. This coil spring is held upon the pin 13 and is arranged to normally force the jaw outward. The pin 13 is positioned inward a suitable distance from the edge of the trap so that when the jaw is sprung it will finally be stopped by the bottom of the trap, the jaw ends being held within the openings 10 as disclosed.

At a suitable point within the socket I secure a staple 22 loosely holding the trigger bar 23 and this trigger bar is arranged to receive the trigger 24, which forms a part of the bait hook 25, this bait hook being provided with an eye 26 encompassing the pin 13, this bait hook being held within the slot 9 formed within the edge flange 8, as clearly disclosed. The trigger 24 is slightly flattened, so that the trigger bar will be properly held below the under surface of this trigger.

When set, all of the working parts of the trap are held within the socket 7, the only part of the trap protruding being the bait hook to which a suitable bait is secured. The base 5 is of such a weight, that the recoil of the striker jaw will not be sufficient to throw the trap. From this it will be seen that the animal to be trapped in no way treads upon the trap base, which could be entirely hidden with bran or any other suitable material.

The operation of my invention is very simple. The bait hook is provided with a suitable bait when the striker jaw is carried into the socket so that the trigger bar can be carried between two of the impaling hooks 16 so that the end thereof may be brought below the trigger 24. The trap is then set upon the floor or the ground. The animal nibbling at the bait upon the hook soon dislodges the trigger bar which results that the impaling striker jaw will be carried outward with such force as to cripple or kill the animal.

In my trap construction, the base is made of such a width as is the striker jaw that it is quite possible to strike and cripple a number of animals, as all surrounding the bait are sure to be struck by one of the impaling points 16.

It is of course understood that these traps are to be made in various sizes and that if desired, the base 5 may be secured to the floor by means of a screw or nail. The trap is simple of construction and positive in its operation, and can be set with ease and accuracy.

Having thus described my said invention, what I claim as new and desire to secure by United States Letters Patent is:

1. The combination with a suitable base having a socket, a pin held within said socket and adjacent to one edge of said base, a jaw pivotally held upon said pin and being arranged to move outward and beyond the edge of said base, a coil spring carried by said pin one end of said spring contacting with said base, the remaining end of said spring contacting with said jaw, a trigger bar arranged to lie over said jaw, and a bait hook secured to said base having a trigger arranged to contact with said trigger bar.

2. The combination with a base having a suitable socket, a pin transversely secured to said base and held within said socket, said base along one edge being provided with two openings, an approximately U-shaped striker jaw provided with projecting points, the ends of said jaws projecting through said openings and being held upon said pin, a coil spring upon said pin, one end being secured to said jaw and the remaining end contacting with the bottom of said socket, said jaw being arranged to extend beyond said base in one of its extreme positions, said jaw in both of its extreme positions contacting with said base, a trigger bar held within said socket and arranged to overlie said jaw in one of its positions, a bait hook carried upon said pin said hook having a trigger, said trigger bar being arranged to be held below said trigger, said socket being of such a depth as to contain all of said instrumentalities excepting said bait hook when said trap is set, as and for the purpose set forth.

3. A trap comprising an oblong base having a suitable socket, a pin transversely held to said base within said socket, said base having two suitable openings near each edge and a central opening, an approximately U-shaped jaw extending through said edge openings and being held upon said pin, a spring coiled about said pin and having one of its ends secured to said jaw, the remaining end of said spring contacting with the bottom of said socket, a bait hook extending through said central opening having an eye coiled about said pin, said bait hook ending in a trigger, a trigger bar secured within said socket, to said base and adapted to overlie said jaw in one of its positions, said jaw in the sprung condition of the trap being stopped against the bottom of the trap, said jaw extending beyond the edge of the trap, all arranged substantially as and for the purpose set forth.

In testimony whereof I affix my signature, in presence of two witnesses.

LATHAM D. PEARSALL.

Witnesses:
ALFRED ROOSEVELT ROACH,
ALBERT M. STRIKER.